March 27, 1945.   C. M. WILLIAMSON ET AL   2,372,637
CINEMATOGRAPH CAMERA
Filed May 26, 1941   3 Sheets-Sheet 1
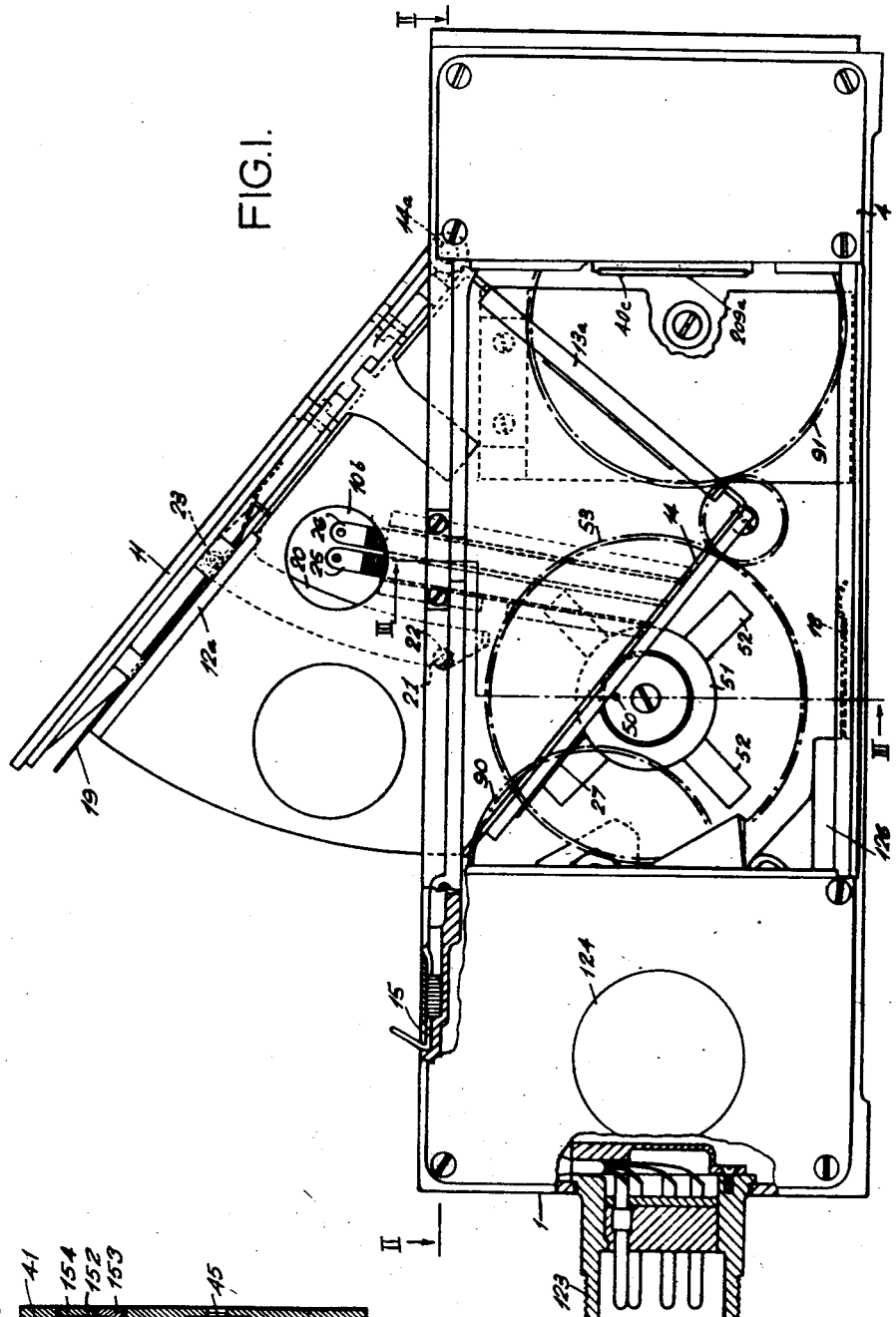
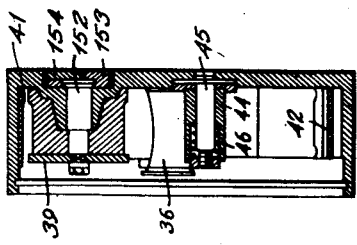
INVENTORS
*Colin Martin Williamson & Stuart Williamson*
BY
ATTORNEY March 27, 1945.   C. M. WILLIAMSON ET AL   2,372,637
CINEMATOGRAPH CAMERA
Filed May 26, 1941   3 Sheets-Sheet 2
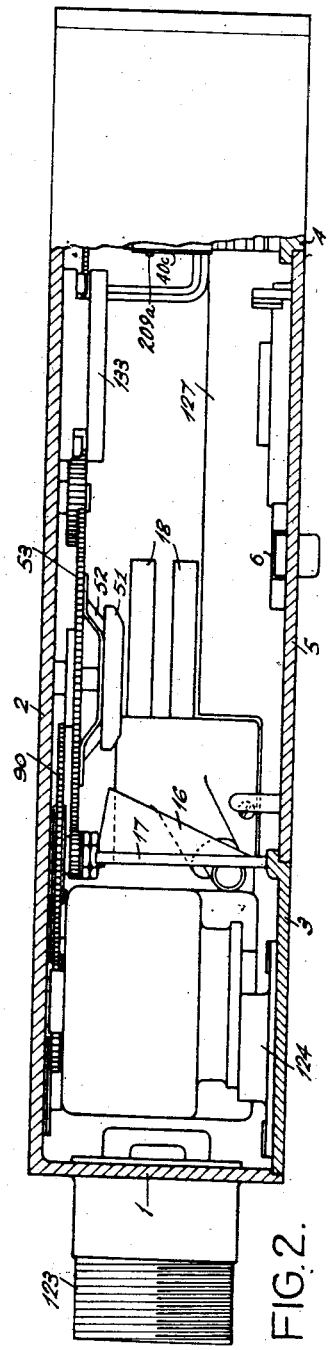
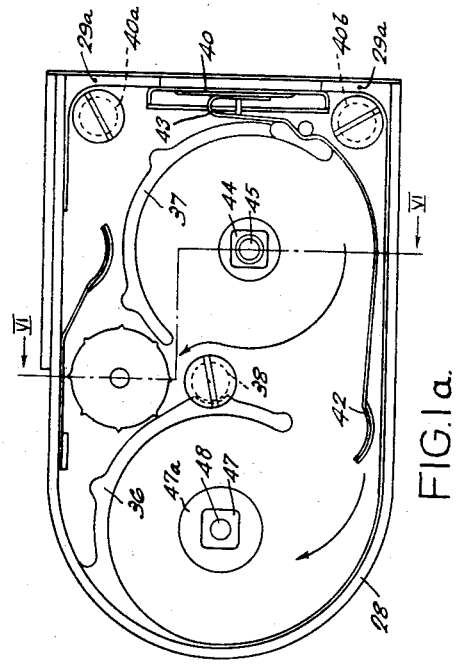
INVENTORS
Colin Martin Williamson + Stuart Williamson
BY   A. E. O'Dell
ATTORNEY Patented Mar. 27, 1945

2,372,637

UNITED STATES PATENT OFFICE 2,372,637

CINEMATOGRAPH CAMERA

Colin Martin Williamson, Bourne End, and Stuart Williamson, Swallowfield, England Application May 26, 1941, Serial No. 395,262
In Great Britain May 14, 1940

8 Claims. (Cl. 88—17)

This invention relates to photographic, especially cinematograph cameras and particularly but not exclusively to the cameras used on aircraft for gunnery training and recording. Its objects include the provision of a compact instrument which can easily and rapidly be charged in positions where accessibility is difficult, which can be driven at a very accurately determined, but variable, speed, which can have its shutter aperture adjusted by remote control, which can be provided with a very long extension lens tube of small diameter while employing a normal focal length of objective, which will count the exposures, which will always stop and start at a definite point in the operating cycle of the film feed, which has provision for maintaining temperature, which is automatically aligned on its mounting, and in which the several sub-assemblies are readily removable and replaceable without mutual interference.

The invention will be further described with reference to the accompanying drawings illustrating by way of example one preferred embodiment thereof.

Figure 1 is a side view of the camera less the lens mount and magazine, with the door and cover panels of the camera body removed and two motor covers removed and with certain portions shown in section.

Figure 1a is a side elevation of the magazine with its lid removed.

Figure 2 is a sectional plan view of the camera with the lens mount removed in the line II—II of Figure 1.

Figure 6 is a section on the line VI—VI of Figure 1b.

The greater part of a camera according to the invention is contained within a body in the form of a rectangular box 1 (for instance a light alloy die-casting) having one complete side 2 closed conveniently integrally and the other completely open, as appears from Figures 1 and 2; the bottom, front, back and top are also conveniently integral, the bottom being complete and the other walls apertured as will appear from the following description.

Figure 3:
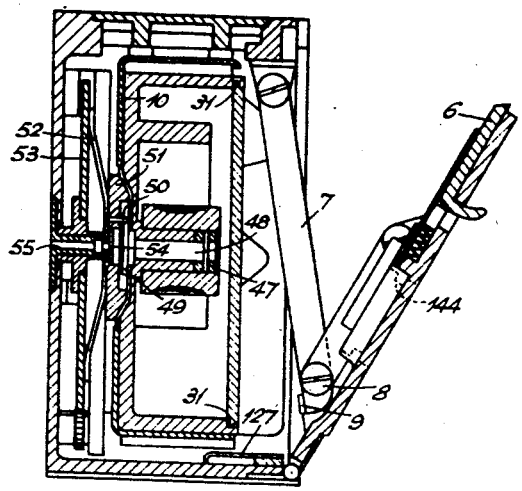
Figure 3 is a section on the line III—III of Figure 1 with the door in position.

The open side of the box is closed at the rear and front portions by respective panels 3, 4, Figure 2, secured by screws, and over the part between the panels by a door 5 hinged along its bottom edge to the box and held closed by a spring catch 6, Figure 3. The extent the door can open is limited by a stay 7 pivoted to the box and door and formed in two parts pivoted together between its ends at 8. A lug 9 on one part engages the other to prevent the three pivots coming quite into line, so that the door can be closed with one hand without the stay needing to be touched.

On the integral side of the box is mounted a train of gearing extending from rear to front, and further described below.

When a camera is mounted in a gun turret it is usually accessible only from the top, while when mounted within the thickness of an aircraft wing it is usually only accessible from the side, and a camera according to the invention is therefore arranged so that it can be charged from top or side. To this end a magazine container seen in Figures 1 and 3 is used which comprises a side wall 10, a double top 11, 12, a front 13 and a bottom 14. This is hinged in light tight fashion at the junction of its top and front, to the top of the box at 14a, so that it can swing in the vertical plane, the hinge pin being merely covered by the front panel 4 so as to be easily removable. When swung up through a slot in the top of the box 1 to the position shown in Figure 1, the magazine can be slid in or out from the rear, and when swung down to the position shown in Figure 3 the top 12 of the container closes the slot and is locked by a spring catch 15 shown in Figure 1. By opening the door 5, the magazine can also be inserted or removed from the side; a bent inclined guide plate 16 (Figure 2) on a partition 17 on the rear panel 3 engages the back of the magazine as it is introduced and guides it forwardly in the container.

The container is normally urged upwards by three leaf springs, two 18, on the bottom of the box constituting at the same time electric connections to contacts 21 on the bottom of the container, and a third 19 between the double top members of the container, which bears on the top of the partition 17. Thus as soon as the catch 15 is released, the container springs upward and can easily be raised further by hand until checked in charging position, shown in Figure 1, by a stay 20, a notch 21 in which engages over a pin 22 in the body. The stay lies between the side wall 10 of the container and the integral side 2 of the box 1 and is pivoted at 23 to the container top and is urged to engaging position by the pressure of a part of the third leaf spring 19 against a flat on its pivot 23. The notch 21 has an inclined lead so that the container can be closed down by simple pressure on its top, while to enable the container to be swung up above engagement of the notch in case of need, the stay 20 can be sprung laterally to clear the pin 22.

To assist in guiding the magazine when inserted from the rear of the container, the inner top 12 of the latter has a downward flange 12a on the open side, while the front 13 of the container has a backward flange 13a to locate the front wall of the magazine. The downward flange 12a only extends over the rear part of the container and only the front half of the magazine is high enough to be engaged by the flange, as will be seen from Figure 1a. Shortly before the magazine is home the flange 12a ceases to restrain it laterally, this provision being necessary to permit insertion and removal of the magazine from the side through the door.

The side wall 10 of the container is apertured at 10a opposite the take up coil in the magazine and also at 10b opposite a sprocket 39 in the latter over which the film runs and so drives it. A pair of contact blades 25, 26 project over the opening at 10b and are connected to the two contacts 27 which engage the two leaf springs 18 when the container is down.

Figure 4:
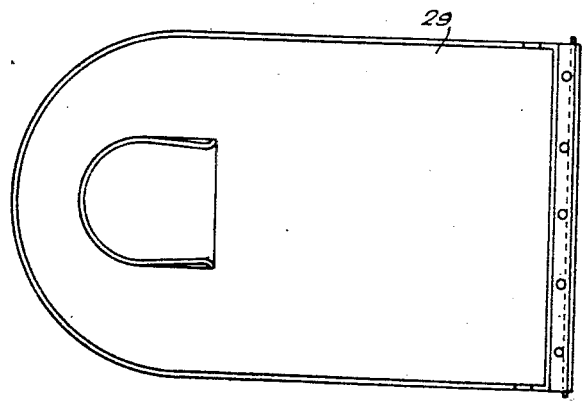
Figures 4 and 5 are a side elevation and a plan of the magazine lid.
Figure 5:
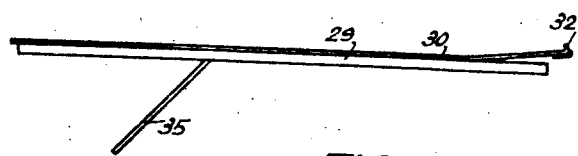

The magazine (Figure 1a) is in the form of an open sided box 28 closed by a lid (Figures 3, 4 and 5). The lid comprises a relatively thick main portion 29 faced with a thin metal portion 30 of larger size which forms projecting margins which slide into grooves 31 in the magazine. As indicated in Figure 5 the portion 30 is bent so that its rear end when free springs inwards a little from the portion 29. When the lid is pushed home recesses in this bent part spring over pins 29a (Figure 1a) which hold the lid in place until deliberately released by springing the portion 30 outwards. The grooves 31 are sufficiently wide at the front end to permit this. When home, a flange 32 on the lid laps over the front wall of the magazine. Towards the rear end a pivoted wire loop 35 normally lies in a recess in the thickness of the lid portion 29, this serving to facilitate removal of the magazine through the door of the box. This loop is shown swung out for use in Figure 5. Inside, the magazine is adapted to receive a supply coil and a take up coil, walls 36, 37 constituting two incomplete compartments for the coils. The film runs from the take up coil which is at the front, over a guide roller 38 between the coils and over the sprocket 39 immediately above the roller near the top of the magazine, then forward, over a roller 40a, through a spring gate 40 on the front wall and over a roller 40b, and thence along the bottom of the magazine to the take up coil. Light leaf springs 41, 42 respectively bear on the film between the sprocket and gate and between the gate and take up coil, to steady it; the tail end 43 of the second spring 42 is bent up into a hairpin form to serve as the spring for the gate. The supply coil fits over a square section core 44 rotatable on a stationary pin 45 (Figure 6) and spring pressed by a spring 46 between pin and core against the side of the magazine to provide a friction drag. The take up core fits over a square head 47 (Figure 3) on a spindle 48 journalled in the side of the magazine and having a head with a cross dog 49 recessed into the outside of the magazine wall. When the magazine is in place this dog is driven by a pin 50 on a friction clutch on one of the members 53 of the gear train in the box 1, this member 53 being suitably placed and geared.

To enable the magazine container to be swung up and down, the driving pin 50 is in a recess in a circular member 51 (Figures 1 and 3) having a coned face and the clutch is constituted by radial spring arms 52 on the back of this circular member engaging the face of the gear member 53. As the container moves up or down the spring arms allow the circular member 51 to yield axially and the coned face provides a lead. The member 51 is prevented from coming off by the head of an axial screw 54 screwing into the stationary pivot 55 of the gear member 53, the screw head lying recessed in the member 51.

The sprocket 39 is carried by a spindle 152 journalled in the wall of the magazine and carrying on its outer end an insulated disc 153 recessed into the magazine wall (Figure 6). A conducting segment 154 on the disc 153 bridges the two contact blades 25, 26 above mentioned once per revolution and thereby sends an impulse to a remote counter placed where desired.

To drive the camera, an electric motor is used, housed at the rear end of the box 1 with its spindle transversely of the optical axis. A wheel on its shaft meshes with the first wheel 90 of the gear train in the box.

The film is conveniently fed by a claw movement, the claw 209a projecting through a slot in the yoke member 40c into the front of the magazine container. The claw mechanism is driven by a gear wheel meshing with the last wheel 91 of the train in the box 1.

The electrical connections may conveniently be made to the camera by a metal shrouded multi-pin plug fitting 123 (Figure 1) which can be secured in either of two holes, one in the rear wall of the box 1 and the other in the rear panel 3, the hole not in use being closed by a suitable plug. As shown in Figure 1 the fitting 123 is secured to the rear wall and the hole in the panel 3 is closed by the plug 124. From the plug fitting 123 a flexible cable 125 (shown broken in Figure 1) leads to a moulded junction block 126 on the bottom of the box 1 mainly in front of the partition 17 carried by the rear panel 3. The two leaf springs 18 above described which engage below the magazine container project from this block.

What we claim is:

1. In a photographic camera the combination of a body having an opening in the top thereof and an opening in the side thereof, a magazine container housed within said body and adapted to be raised through said top opening into a position in which a magazine can be inserted into said container from an end thereof, means locating said container in position when it is housed, said container having an opening in its side facing said side opening in the camera body and both said side openings being of sufficient size to admit insertion of a magazine into said container when it is in housed position, and means for closing both said body openings in light tight fashion.

2. In a photographic camera the combination of a body having an opening in the top thereof and an opening in the side thereof, a magazine container housed within said body, hinge means connecting said container with said body enabling it to be swung upwards through said top opening, means on said container closing said top opening in light tight fashion when said container is housed, said container having an opening in its side facing and registering with said side opening in said body when housed, and both said side openings being of sufficient size to admit insertion of a magazine into said container when it is housed, and a door adapted to close said side body-opening in light tight fashion.

3. A photographic camera in accordance with claim 2 also comprising a magazine, guide engaging means on the front portion thereof and not extending beyond half its length, and guiding means on the rear portion of said container and not extending beyond half its length.

4. A photographic camera in accordance with claim 2 also comprising releasable means holding said container in housed position and spring means reacting upon said body whereby said container is swung up upon release of said releasable means.

5. A cinematograph camera in accordance with claim 2 also comprising a magazine for film, means in said body for feeding film while in said magazine, a sprocket in said magazine adapted to be rotated by the passage of film when fed by said feeding means, electric contacts on the bottom of said container, means actuated by said sprocket for closing a circuit through said contacts at intervals, contact springs in said box pressing upwardly against said contacts, releasable means holding said container in closed position, and connections leading from said contact springs outside said camera body.

6. A cinematograph camera in accordance with claim 2 also comprising a magazine for film, means in said body for feeding film while in said magazine, rotary take up means for film in said magazine, an axially retractable coned member within said box in axial alignment with said take up means, a rotating member coaxial with said coned member and geared to said film feeding means, a friction clutch conveying drive from said rotating member to said coned member, spring means urging said coned member towards said take up means, and a driving member housed within a recess in the front of said coned member adapted to convey drive to said take up means.

7. In a cinematograph camera the combination of a body having an opening in the top thereof and an opening in the side thereof each large enough to admit a magazine, a magazine container open on one side housed within said body with its open side in register with one of said openings in the body, hinged means connecting said container with said body along the edge of the other of said openings in the body enabling said container to be swung outward through said other opening, means on said container closing said other opening when the container is housed within said body, and a door upon the body closing the opening in register with the open side of said container.

8. A cinematograph camera in accordance with claim 23 also comprising a magazine for film fitting within said magazine container, rotary take-up means for film within said magazine, and take-up driving means in the camera body adapted to engage and drive said take-up means in the magazine when the magazine is in the container and the container housed within the body, said take-up means being disengageable from said driving means by swinging of the magazine container about its hinge and also by withdrawal of said magazine through the open side of the magazine container and the opening in the body registering therewith.

COLIN MARTIN WILLIAMSON.
STUART WILLIAMSON.